United States Patent [19]

Parr

[11] 4,251,712

[45] Feb. 17, 1981

[54] PACKAGING ARRANGEMENT FOR ELECTRICAL HEATING UNITS ADAPTED FOR ADHESIVE ATTACHMENT TO A SURFACE

[75] Inventor: David Parr, Surrey, England

[73] Assignee: David Parr & Associates Ltd., England

[21] Appl. No.: 875,924

[22] Filed: Feb. 7, 1978

[30] Foreign Application Priority Data

Jun. 23, 1977 [GB] United Kingdom ............... 26298/77

[51] Int. Cl.$^3$ .......................... H05B 3/26; B32B 7/06; E06B 7/12

[52] U.S. Cl. ...................................... 219/203; 29/611; 52/171; 174/117 A; 174/117 FF; 174/117 F; 206/447; 206/460; 206/484; 206/813; 219/213; 219/542; 219/543; 338/212; 338/314; 338/328; 428/40; 428/344

[58] Field of Search ............... 219/203, 213, 219, 522, 219/528, 541-543, 549, 345, 464, 467, 536, 526, 552, 553; 174/117 A, 117 FF, 117 F; 52/171; 388/306, 307, 308, 311, 314, 328, 212, 214; 29/611, 620, 621; 428/40-42, 178, 344, 352; 206/460, 447, 484, 813

[56] References Cited

U.S. PATENT DOCUMENTS

| | | | |
|---|---|---|---|
| 1,743,903 | 1/1930 | Reece | 206/447 X |
| 3,655,496 | 4/1972 | Ettre et al. | 428/41 |
| 3,736,404 | 5/1973 | Eisler | 219/203 |
| 3,757,087 | 9/1973 | Bernard | 219/203 X |
| 3,865,953 | 2/1975 | Peters | 206/461 X |
| 4,065,848 | 1/1978 | Dery | 219/203 X |

FOREIGN PATENT DOCUMENTS

| | | | |
|---|---|---|---|
| 348864 | 10/1960 | Switzerland | 428/40 |
| 1487551 | 10/1977 | United Kingdom | 219/203 |

*Primary Examiner*—A. Bartis

*Attorney, Agent, or Firm*—Lerner, David, Littenberg & Samuel

[57] ABSTRACT

A packaging arrangement for an electrical heater unit adapted for adhesive attachment to a surface, for example, to a window of a motor vehicle. The heater unit includes a plurality of heater strips which have an adhesive coating on one face thereof whereby the strips may be secured to the window. The strips are supported in a desired pattern for application to the window by being adhesively mounted on one surface of a backing sheet. The adhesive coated surfaces of the strips are remote from the backing sheet and a removable cover sheet overlies the heater strips. A clearance is provided between the cover sheet and the adhesive coating on the heater strips so that the cover sheet is not contacted by the adhesive coating on the heater strips. During application of the heater to the window, the cover sheet is first removed, the heater strips carried by the backing sheet are then applied to the window so that their adhesive coating bonds them to the window and lastly the backing sheet is removed leaving the strips adhered to the window.

11 Claims, 4 Drawing Figures

PACKAGING ARRANGEMENT FOR ELECTRICAL HEATING UNITS ADAPTED FOR ADHESIVE ATTACHMENT TO A SURFACE

This invention relates to an electrical heater unit adapted for attachment to a surface, preferably but not necessarily a window surface of a motor vehicle, to be heated, the unit being of the kind including a plurality of heater strips having an adhesive coating on one face thereof whereby the strips may be secured to the surface to be heated. The strips are supported for application to the surface to be heated by an adhesive coating on one surface of a backing sheet. The adhesive coated faces of the heater strips are remote from the backing sheet, the strips being sandwiched between the backing sheet and a removable cover sheet adhered to the adhesive coating on the backing sheet between the heater strips. The cover sheet can be removed to permit engagement of the adhesive coating of the heater strips with the surface to be heated, the backing sheet being detached from the heater strips subsequent to the adhesion of the heater strips to the surface to be heated.

In a known form of the heater unit described above, the cover sheet engages and adhesively contacts the adhesive coating on the heater strips. Such a construction, however, creates a problem in that the adhesive properties of the adhesive coatings on the strips can be deleteriously affected. It is an object of the present invention to minimize this problem.

In accordance with the present invention, in a heater unit of the type described above the cover sheet adheres to the adhesive coating of the backing sheet between the heater strips. However, a clearance is provided between the cover sheet and the adhesive coating on the heater strips so that the cover sheet is not engaged with the adhesive coating of the heater strips.

Preferably, the backing sheet is formed with grooves or channels in which the heater strips lie. The depth of the grooves or channels in the backing sheet is sufficient to ensure that the surface of the adhesive coating of the strips lies below the surface of the adhesive coating on the remainder of the backing strip, whereby a clearance exists between the cover sheet and the adhesive coating on the strips when the cover sheet is adhesively secured to the adhesive coating of the backing sheet.

Alternatively, the cover sheet may be formed with grooves or channels aligned with the heater strips. The depth of the grooves or channels is sufficient to ensure a clearance between the adhesive coating on the heater strips and the surface of the cover sheet.

Conveniently, the grooves or channels are provided in the cover sheet or the backing sheet by an embossing process. Alternatively, the grooves or channels can be formed by folding the cover sheet or the backing sheet.

One exemplary embodiment of the invention is illustrated in the accompanying drawings, wherein.

Figure 1:
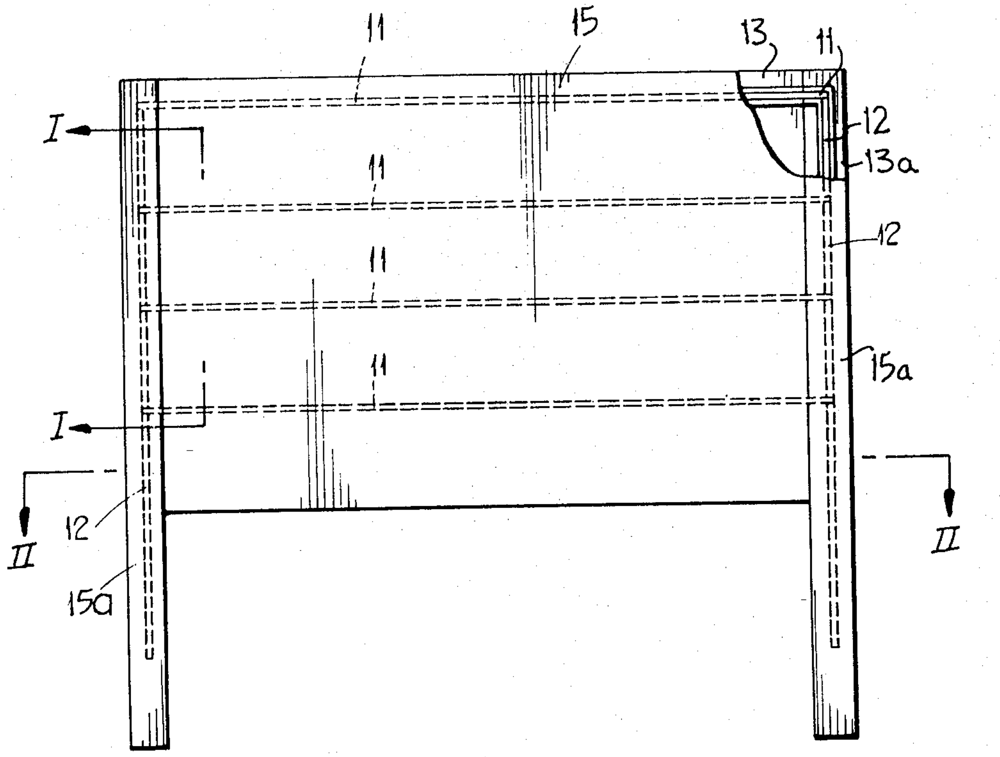
FIG. 1 is a diagrammatic plan view of an electrical heater unit for application to a vehicle window or the like, a portion of the unit being broken away to facilitate consideration and discussion.

Referring to the drawings, the heater unit comprises a plurality of heater strips 11 formed from nickel-chrome tape. The heater strips 11 extend parallel to one another and are electrically connected in parallel at their ends by a pair of connector strips 12. The connector strips 12 are formed from tinned copper foil and have a resistivity considerably lower than that of the heater strips. The heater strips 11 are connected to the connector strips 12 by soldering, or by resistance welding.

The strips 11, 12 have corresponding surfaces which are provided with an adhesive coating 17. The adhesive coating 17 permits the strips 11, 12 to be secured to a surface to be heated, for instance, the rear window of a motor vehicle.

The heater strips 11 are supported on a paper backing sheet 13 by being adhesively secured to an adhesive layer 14 on the backing sheet 13. A cover sheet 15 overlies the heater strips 11 and is secured in position by the adhesive layer 14 between the strips 11. While it would be possible for the connector strips 12 to be supported by the backing strip 13 and to be covered by the cover sheet 15, as a result of the desired manufacturing process to be described below, the strips 12 are supported on separate backing strips 13*a*. Each of the backing strips 13*a* carries an adhesive layer 14*a* whereby the backing strips 13*a* adhere to both the backing sheet 13 and the strips 12. The strips 12 are covered by respective cover strips 15*a* equivalent to the cover sheet 15 and adhering to the adhesive layer on the strips13*a*.

The unit described above is manufactured in the following manner.

The backing sheet 13 and the cover sheet 15 are obtained as a single roll of an assembly comprising an extremely long length of the backing sheet material 13 and an equal length of the cover sheet 15, the overlapping portions of the backing sheet 13 and the cover sheet 15 being secured together by the interposed adhesive layer 14. The cover sheet 15 is siliconed release paper, and thus when pulled away from the sheet 13 the adhesive layer 14 will remain adhered to the backing sheet 13. The composite material is fed from the roll by a feed mechanism to a splitter where the siliconed release paper is separated from the adhesive layer 14 on the main paper which will consitute the backing sheet 13. A plurality of nickel-chrome tapes constituting the heater strips 11 are fed from continuous reels through a cleaning station to an adhesive coating station wherein corresponding surfaces of each of the strips are coated with a thermal/time cross-linking acrylic adhesive 17, for example, the adhesive known by the National Adhesive's Limited code number A80 1000. This adhesive is applied to the strips 11 in solution, and the strips then pass beyond the adhesive application station and through a drying station wherein the solvent of the adhesive is evaporated to dry the adhesive onto the strips 11. The heat involved in evaporating the solvent of the adhesvie also partially cures the adhesive. The strips 11 then pass between the, at this stage separated, siliconed release paper and the main paper i.e., the backing sheet 13, carrying the adhesive layer 14. The siliconed release paper, i.e., the cover sheet 15, and the main paper, i.e., the backing sheet 13, are then pressed back together with the strips 11 running in parallel therebetween. This assembly is then cut into predetermined lengths. Each of the predetermined lengths is then treated individually.

A notched guillotine is used to cut the paper layers at each end of each length of the release paper, heater strip, and backing sheet assembly to leave short exposed ends of the heater strips 11 projecting from the cover sheet 15 and the backing sheet 13. The projecting short ends are then cleaned and fluxed, and the two connector strips 12 of tinned copper foil are soldered to opposite ends of the heater strips 11 by multi-head soldering iron.

As an alternative to soldering the strips 12 in position, a multi-head resistance welding tool may be used to resistance weld the ends of the strips 11 to the strips 12.

Thereafter a similar pressure-sensitive, thermal/time cross-linking acrylic adhesive 17*a* is applied to the surface of the strips 12 corresponding to the adhesively coated surface of the strips 11 and is dried. The backing strip 13*a* is then applied beneath each of the connector strips 12 and overlaps the backing sheet 13, the backing strip 13*a* adhering by virtue of its adhesive layer to both the backing sheet 13 and the connector strip 12. A cover strip of a siliconed release paper is then laid over each of the connector strips 12.

When it is desired to apply a heater unit of the type described above to a window of a vehicle, the surface to which the heater unit is to be applied is first thoroughly cleaned. Thereafter, the cover sheet 15 and the cover strips of the unit are peeled off leaving the heater unit adhering to the layer 14 on the backing sheet 13 and backing strips 13*a*. The heater unit supported by the backing sheet 13 and backing strips 13*a* is then applied to the window and is pressed firmly against the window so that the adhesive coated surfaces of the strips 11, 12 firmly engage the window. The backing sheet 13 and the backing strips 13*a* are then peeled off leaving the heater attached firmly to the window. This is possible because the adhesive on the heater strips 11 and the connector strips 12 has a bond with the glass of the window considerably greater than the bond between the heater strips 11 and the adhesive on the backing sheet 13 and backing strips 13*a*. Electrical connections are made in any convenient manner to the strips 12 so that an electrical current can be supplied to the heater strips 11 to cause heating.

The heater unit described above together with its method of manufacture create certain problems in that the cover sheet 15 and the equivalent cover strips can engage and adhere to the adhesive on the strips 11 and strips 12. It is found that this impairs the adhesive qualities of the adhesive coatings on the strips 11, 12, for two possible reasons. Firstly, a pressure sensitive adhesive will firmly grip any reasonably clean surface against which it is applied. The adhesive layer can then be peeled away from the clean surface and reapplied. It is found that the firmness of the attachment to the clean surface diminishes each time the adhesive layer is peeled away and then reapplied. It follows therefore that in peeling the cover sheet 15 from the adhesive on the strips 11, 12 when preparing to apply the strips 11, 12 to a window, there is a reduction in the maximum theoretical adhesion which could be achieved between the heater strips 11 and the window.

Secondly, since the cover sheet 15 and the backing sheet 13 are originally adhesively secured together and then separated it is found that slight traces of the pressure sensitive adhesive which should remain on the backing sheet 13 do, in fact, remain as a "scum" on the surface of the cover sheet 15. If the cover sheet 15 is then applied, still carrying this slightly tacky "scum" to the assembly of the strips 11 and the sheet 13, the adhesive coating 17 on the strips 11 becomes contaminated by the "scum" and its adhesive properties are thus impaired. In the manufacturing process described above, steps are taken to prevent this by passing the siliconed release paper strip over paper covered pick-up rollers which remove the "scum" from the siliconed release paper strip. If not all of the "scum" is removed by the paper covered rollers, when the heater unit is ultimately applied to the window, the adhesive coating 17 of the strips 11 will adhere not directly to the glass of the window but to a stratum of weak adhesive (the scum), which acts as an interface.

Figure 2:
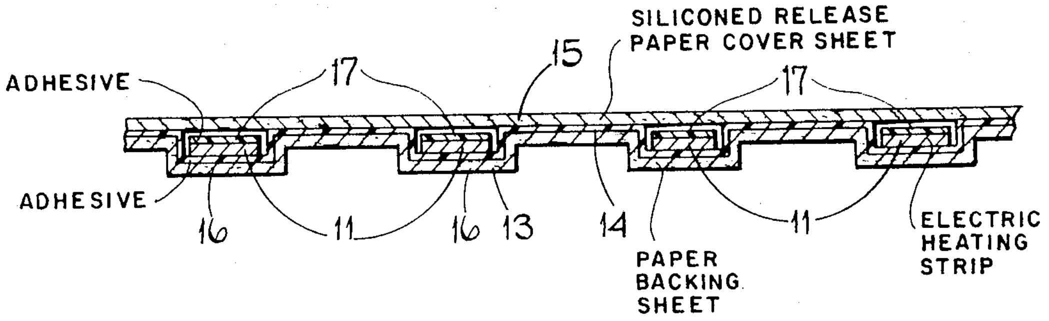
FIG. 2 is an enlarged diagrammatic cross-sectional view, taken along line I—I in FIG. 1 and looking in the direction of the arrows, of part of the unit shown in FIG. 1.
Figure 4:
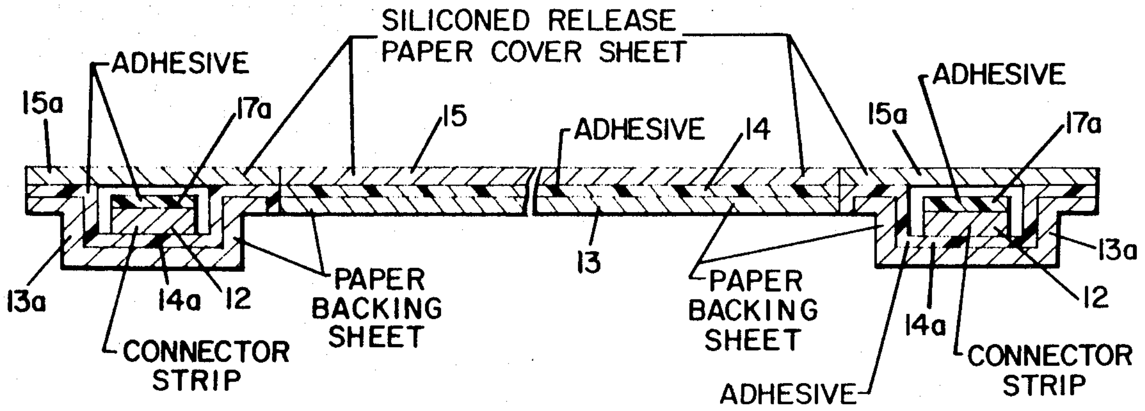
FIG. 4 is an enlarged diagrammatic cross-sectional view, taken along line II—II in FIG. 1 and looking in the direction of the arrows, of another part of the unit shown in FIG. 1.

In order to minimize the aforementioned problems, as shown in FIG. 2, the backing sheet 13 is embossed to form shallow grooves or channels 16. The embossing takes place after separation of the cover sheet 15 from the backing sheet 13 and is accomplished by passing the continuous strip of the backing sheet 13 between embossing rollers. The female roller, having circumferential grooves, is formed from steel and engages the uncoated face of the backing sheet 13. The male roller, having continuously circumferential ribs, is formed from polytetrafluoroethylene and engages the adhesive layer 14 of the backing sheet 13. The adhesive does not bond to the polytetrafluoroethylene ribs. The grooves and ribs of the embossing rollers are aligned with the incoming heater strips 11 so that as the strip of cover sheet is recombined with the strip of backing sheet the embossed channels or grooves are automatically aligned with the heater strips 11. The depth of the embossing is such that there is a clearance between the cover sheet 15 and the adhesive 17 on the strips 11. Thus the adhesive 17 on the strips 11 lies below the level of the adhesive layer 14 over the remainder of the backing sheet 13. The backing strips 13*a* of the connector strips 12 are similarly embossed to ensure that the cover strips do not engage the adhesive coating on the connector strips 12.

It will be understood that by ensuring that there is a clearance between the cover sheet 15 and the adhesive coatings on the strips 11, 12, the impairment the adhesive qualities of these adhesive coatings is greatly minimized if not totally prevented. Furthermore, it might prove possible to dispense with the paper covered pick-up rollers for removing the "scum" from the cover sheet 15, although in the interests of safety it may prove preferable to retain the use of such pick-up rollers to minimize the amount of "scum" present.

Figure 3:
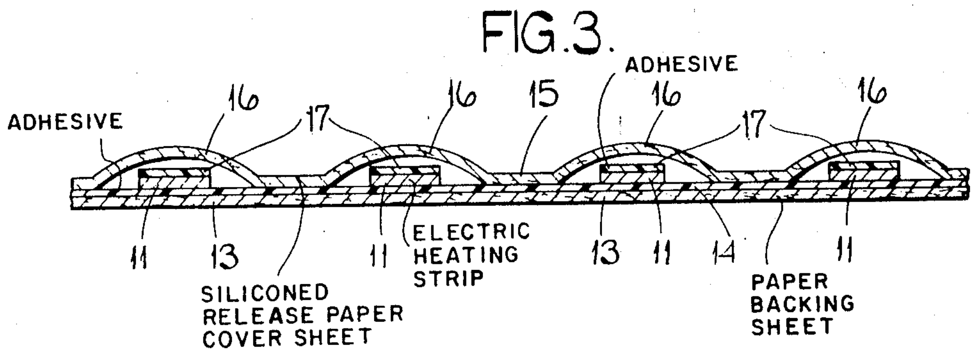
FIG. 3 is a view similar to FIG. 2 of an alternative embodiment of the invention.

As an alternative to embossing the backing sheet 13 the cover paper 15 could be embossed as shown in FIG. 3 to produce grooves or channels 16 therein. In such an arrangement, the heater strips 11 would be adhesively secured to the backing sheet 13 beneath the grooves or channels 16 which would be of a depth sufficient to ensure that the surfaces of the adhesive coatings of the strips 11, 12 lie clear of the surface of the cover sheet 15.

As an alternative to embossing either the backing sheet 13 or the covering sheet 15, the grooves or channels 16 could be provided by a folding technique, rather than an embossing technique.

I claim:

1. In combination, an electric heater comprising generally planar heater means for heating a surface to be heated, said heater means having a pair of opposite surfaces, and first adhesive means, said first adhesive means having an unexposed adhesive surface attached to one surface of said pair of opposite surfaces of said heater means and an exposed adhesive surface opposite said unexposed adhesive surface, for adhesively attaching said heater means to a surface to be heated; and a package enclosing said electric heater, said package including supporting means underlying the other of said pair of opposite surfaces of said heater means for supporting said heater means, covering means for covering said exposed adhesive surface of said first adhesive means, second adhesive means on said supporting means for removably and adhesively attaching said supporting means to said covering means and to said other surface of said heater means, and spacing means on at least one of said covering means and supporting means for spacing said exposed adhesive surface of said first adhesive means a distance from said covering means, said distance being selected so as to inhibit said exposed adhesive surface of said first adhesive means from contacting said covering means.

2. A combination according to claim 1, wherein said heater means includes a plurality of spaced-apart heater strips, each of which has a first surface and a second surface, said one surface of said heater means including said first surfaces of said heater strips and said other surface of said heater means including said second surfaces of said heater strips.

3. A combination according to claim 2, wherein said first adhesive means is a first adhesive applied to said first surfaces of said heater strips, said covering means being removably and adhesively attached to said supporting means between adjacent pairs of said heater strips by said second adhesive means.

4. A combination according to claim 3, wherein said spacing means includes a plurality of channels formed in said supporting means, each of said channels receiving a corresponding one of said heater strips and having a depth selected so that said exposed adhesive surface of said first adhesive is positioned a distance from said covering means when said heater strips are adhesively attached to said supporting means.

5. A combination according to claim 4, wherein said supporting means is a first sheet, having a substantially corrugated shape defining said plurality of channels, and said covering means is a second sheet, having a substantially planar shape.

6. A combination according to claim 5, wherein said second adhesive means is a second adhesive, the bond between said second adhesive and said first surfaces of said heater strips being less than the bond between said first adhesive and a surface to be heated.

7. A combination according to claim 4, wherein each of said channels is an embossment.

8. A combination according to claim 3, wherein said spacing means includes a plurality of channels formed in said covering means, each of said channels receiving and covering a corresponding one of said heater strips and having a depth selected so that said exposed adhesive surface of said first adhesive when said heater strips are attached to said supporting means is positioned a distance from said covering means.

9. A combination according to claim 8, wherein said covering means is a first sheet having a substantially corrugated shape defining said plurality of channels, and said supporting means is a second sheet, having a substantially planar shape.

10. A combination according to claim 9, wherein said second adhesive means is a second adhesive, the bond between said second adhesive and said second surfaces of said heater strips being less than the bond between said first adhesive and a surface to be heated.

11. A combination according to claim 8, wherein each of said channels is an embossment.

* * * * *

UNITED STATES PATENT AND TRADEMARK OFFICE

CERTIFICATE OF CORRECTION

PATENT NO. : 4,251,712

DATED : February 17, 1981

INVENTOR(S) : David Parr

It is certified that error appears in the above—identified patent and that said Letters Patent is hereby corrected as shown below:

Column 4, line 44, after "impairment" insert -- of --.

Column 6, line 12, "first" should read -- second --.

Signed and Sealed this

*Twenty-sixth* Day of *May 1981*

[SEAL]

*Attest:*

RENE D. TEGTMEYER

*Attesting Officer* *Acting Commissioner of Patents and Trademarks*